H. M. SCHUTZ.
AUTOMATIC ADVERTISING OR DISPLAY APPARATUS.
APPLICATION FILED FEB. 11, 1905.

911,618.

Patented Feb. 9, 1909.
4 SHEETS—SHEET 4.

WITNESSES:
Edw. D. Spring
W. P. Burke

INVENTOR.
Harry M. Schutz
BY Richards & Co.
ATTYS

UNITED STATES PATENT OFFICE.

HARRY M. SCHUTZ, OF MILAN, ITALY.

AUTOMATIC ADVERTISING OR DISPLAY APPARATUS.

No. 911,618.

Specification of Letters Patent.

Patented Feb. 9, 1909.

Application filed February 11, 1905. Serial No. 245,314.

*To all whom it may concern:*

Be it known that I, HARRY M. SCHUTZ, a subject of the King of Great Britain, residing at Milan, 15 Via Olona, Italy, mechanical engineer, have invented certain new and useful Improvements in or Relating to Automatic Advertising or Display Apparatus, for which I have applied for Letters Patent in Italy on January 21, 1905, and of which the following is a specification.

This invention relates to a new or improved form or system of automatic display apparatus, by means of which a series of plates carrying lamps, illuminated signs forming words, letters or legends as occasion may demand, are arranged and caused to describe certain eccentric and concentric evolutions—the whole driven and controlled by certain mechanism hereafter to be described—so as to form an attraction for advertising or other purposes.

Figure 1:
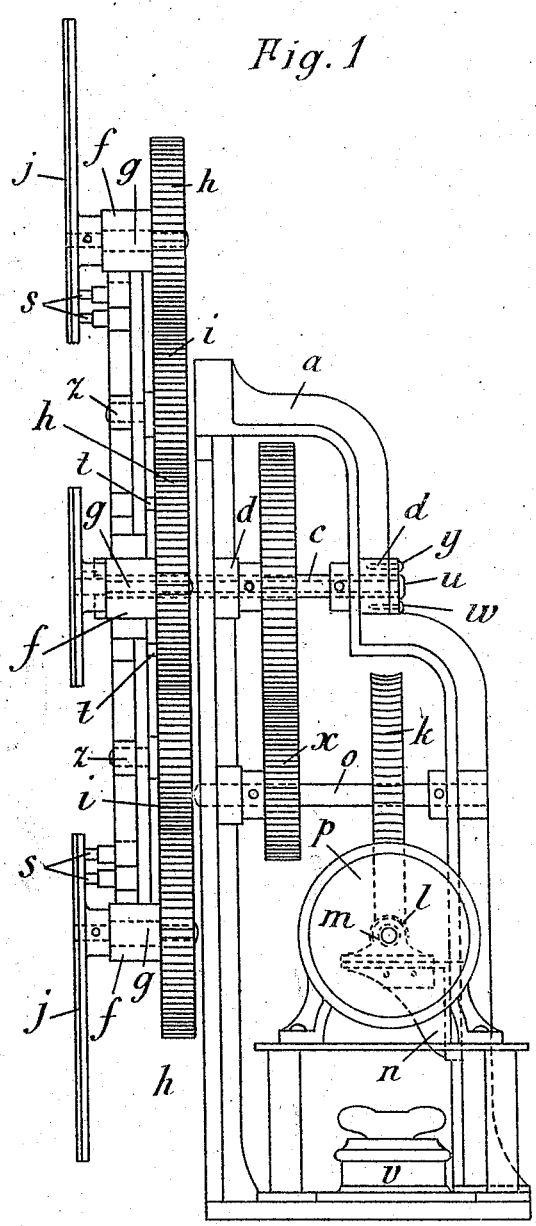
Figure 2:
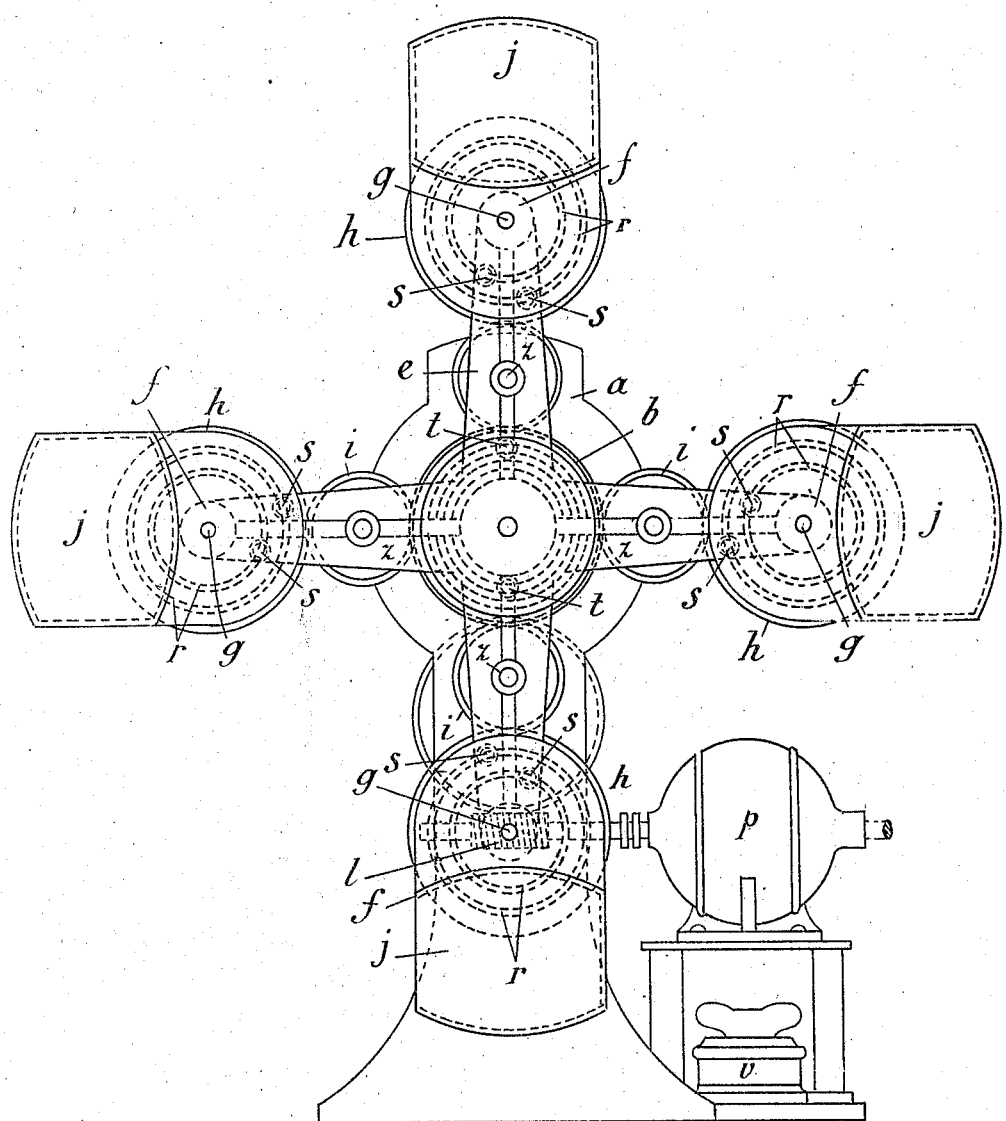
Figure 3:
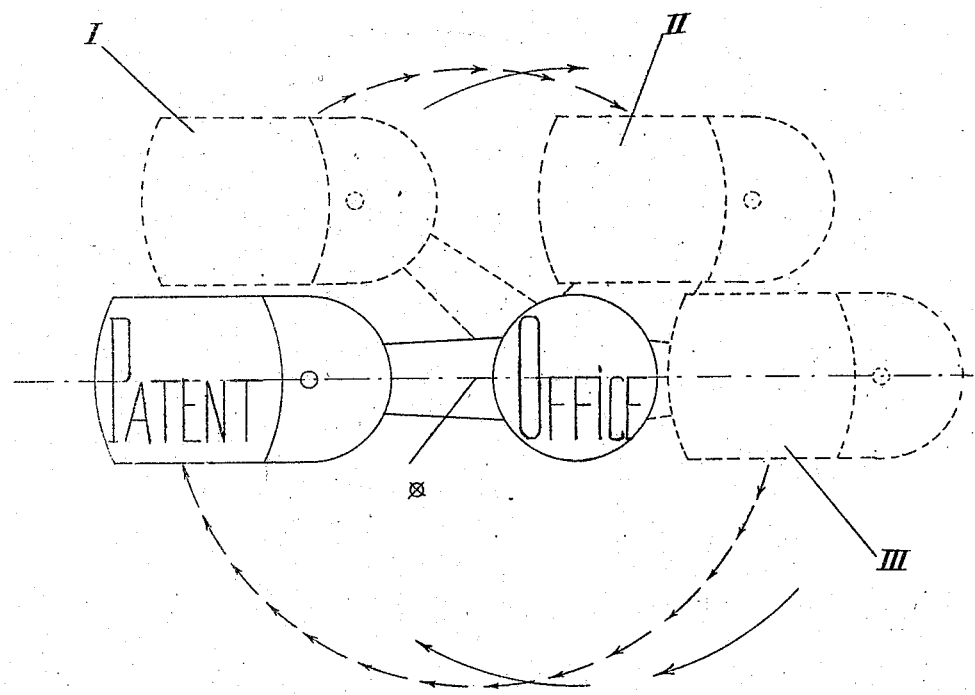
Figure 4:
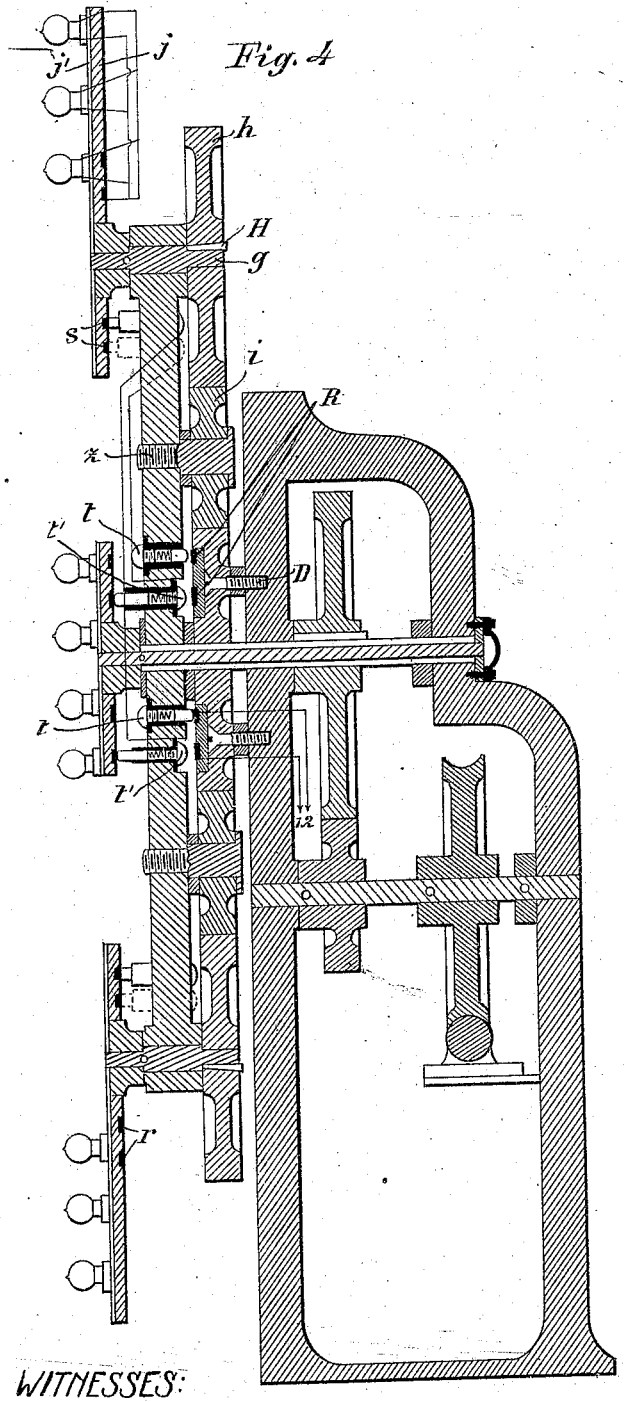
Figure 5:
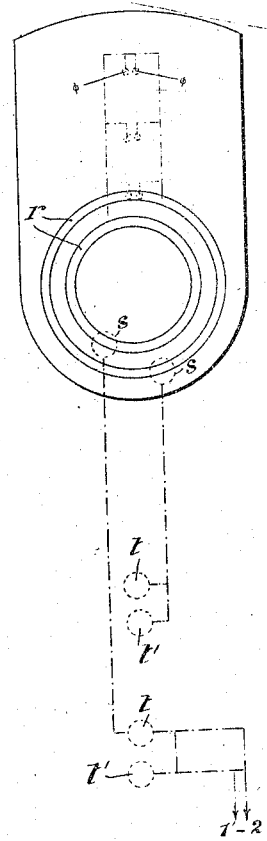
Figure 6:
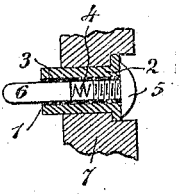

Referring to the drawings, Figure 1 is a side elevation, Fig. 2 a front elevation of the machine, Fig. 3 a diagram explaining the eccentric movements. Fig. 4 is a sectional view. Fig. 5 is a back view of one of the plates and showing the electrical connections diagrammatically. Fig. 6 is a detail view of one of the brushes and its connections.

On the outer wall of a frame work *a*, made of iron or other suitable material, is tightly fixed by screws D a toothed gear wheel *b*. Through the center of the same protrudes a hollow shaft or axle *c*, running in bearings *d, d*, formed by bosses cast on the frame work *a*. Keyed and fixed tight on the protruding end of the shaft is a spider *e*, and at the extremity of each of its arms (the bosses *f, f*, serving as running bearings) is a spindle *g*. On one side of each boss, and fixed tight on the spindle by key H, is another gear wheel *h*, of the same diameter as *b*. Gear communication is furnished by the smaller toothed wheel *i*, free to revolve on its supporting stud *z*, screwed into a boss cast on the arm of the spider *e*. On the other side of the boss *f* and also fixed tight on the spindle *g* is a plate *j* made preferably of some non conducting material such as hard fiber or ebonite, on which are arranged the lamps or illuminated signs or legends as the case may be. It now follows that the main shaft *c* being provided with a toothed gear wheel *w* gearing into another of similar pitch *x*, fixed on a subsidiary shaft *o*, on which same shaft is also keyed a geared worm wheel *k*, caused to revolve through the agency of an endless screw or worm *l*, suitably supported at *n*, and running in bearings *m* and coupled either direct or by means of a belt or other means to the shaft of a motor *p*, the spider *e* will revolve on supplying current to the motor. Now by means of the communicating gears *i i* being compelled to turn and travel across the periphery of the fixed wheel *b*, and as the wheels *h, h,* have the same diameter as the fixed wheel *b* it follows that during the movement or rotation of the spider the plate *j* will always remain suspended in the same predisposed vertical, horizontal or other plane. This will be seen to be of the utmost importance, to keep the words or signs always in the requisite upright position so as to render them perfectly legible, and to obviate confusion.

Referring now to Fig. 2 it will be seen that the plates are arranged and thrown out of the working centers of the spindles *g*, on which they are mounted and it is by this means that the peculiar eccentric evolution are caused to take place, because the plates always keeping their predisposed position during the revolving of the star arms supporting them, will consecutively approach towards and recede from the main center, and precisely during every half of a complete revolution of the spider *e*, that is to say, for exactly one half of a complete revolution of the spider, the plates advance towards the center, whereas for exactly the remaining half, they recede from the center, to take up their original position at the completion of each revolution.

To easier understand the eccentric course described above, reference may be had to Fig. 3, and for simplicity's sake, we will follow the course of but one of the plates and imagine that the spider has but one arm, and further we will adopt the legend "Patent Office" to render our explanation more lucid. In this case we let remain on the fixed center plate the word "Office" this being achieved with the greatest care by means of the shaft protruding through the hollow central axle, and which will be hereafter described. On each of the revolving plates we will arrange the word "Patent." Presuming now that the spider revolves in the direction of the long arrows, and that the legends always remain in the correct legible plane by virtue of the gear disposition already described, it follows that the plate bearing the legend will describe or trace an eccentric course which same will be represented by the short arrows, and whose center theoretically will be somewhere about the point x. On Fig. 3 are shown in dotted outline three of the various positions of the plate during its course, I. II. III. one of which III. at exactly half a complete revolution of the spider and where it will be seen that the plate with the legend "Patent" has approached towards the center. Leaving this position and on its onward course, the plate will again recede from the center to take up its original position from which it started, and so on. This remains of course true for any number of plates carried by a spider having a corresponding number of supporting arms, and the more the plates are thrown out of their centers the greater the eccentricity. It will be seen from the above that in any position, we always read the combination "Patent Office." The composition of legends is of course left to the conditions imposed by the advertisement, and becomes a matter of taste and judgment for their arrangement and disposition.

The electrical connections are shown in Fig. 4 and diagrammatically in Fig. 5, where there is shown the mode of wiring of one group of lamps disposed on one of the plates $j$ are the lamp terminals, and all the lamps are wired in "parallel," the two leads from them being soldered securely to two metallic rings $r$, fixed on the back of each plate $j$ on which the lamp sockets are attached in any suitable and convenient manner. Referring to Fig. 5, connection is established and maintained with the rings $r$, by the brushes $s$, $s$, pressing continually upon them, said brushes being carried by the spider arm. Wires lead from the terminals of these brushes to the terminals of main brushes $t$, $t$, carried on the spider, which in their turn, keep up connection with the lamps by pressing continually upon the two metal rings $r$ embedded in insulating material attached to the face of the central fixed gear wheel $b$. Current is supplied by the two main leads 1, 2, securely soldered to the above-mentioned rings $r$ and well insulated from the surrounding metal work in the usual manner employed in such cases. The derivations from each group of lamps arranged on each of the plates $j$ are arranged in exactly the same manner as in the example given (Fig. 5), all the leads terminating at, and attached to, the main brush terminals $t$, $t$. The central plate (shown in Fig. 4, but not in Fig. 1) is supplied with current on exactly the same principle as the other plates $j$—by the two brushes $tt$, the terminals of which are connected direct to the terminals of the main brushes, as above described for the other plates. All the wires which lead along the arms of the spider are attached closely to the same, and properly insulated in the manner usually adopted in every day practice, and the brushes and their holders are insulated from the surrounding metal work of the spider by ebonite tubing and washers, shown in Fig. 6, where 1. is the ebonite insulating tube or sheath driven transversely into the metal of the spider $e$. 2. is an ebonite washer, 3 is an inner sheath of brass or copper holding the terminal screw 5. to which the lead wires are bound for contact, 4. is a spiral spring which allows resilient pressure to the brush 6. Current is supplied to the motor through the larger main switch $v$.

It will be obvious that with the above described system of conducting rings and brushes, perfect security of contact is obtained, and insured.

To facilitate the spelling or composition of different words or legends, there is also disposed the plate, before referred to which can be fixed on the shaft $c$, and immediately in front of the spider, thus revolving with the same; this is however only suitable where one letter is to be carried, and that letter a circular one, legible in any position, and as it is more necessary to carry on the plate an entire word, which same must always remain in the same horizontal plane, then this same may be achieved by fixing the central plate on a spindle $u$, running through the shaft $c$, and fixed to the frame $y$ with a flange. It will now be evident why the main shaft has been designed to remain hollow, in the form of a tube. Current is supplied to this plate as above set forth.

Having now particularly described the nature of my invention, and the manner in which the same is to be performed, I declare that what I claim as my invention and desire to secure by Letters Patent is:—

1. A display apparatus comprising a spider, a shaft carried by the outer end of each arm of the spider, a plate eccentrically mounted on each shaft, means for rotating the spider and means for rotating the shafts, said means keeping the plates in a predisposed plane.

2. A display apparatus comprising a spider, a shaft carried by the outer end of each arm thereof, a plate eccentrically mounted on each shaft, a stationary gear concentrically arranged with relation to the axis of the spider, gears on the plate carrying shafts, gears $i$ carried by the spider and meshing with the stationary gear and the gears on the shafts, the said gears being so arranged as to keep the plates in a predisposed plane and means for rotating the spider.

3. A display apparatus comprising a spider, a shaft carried by the outer end of each arm thereof, a plate eccentrically mounted on each shaft, a stationary gear concentrically arranged with relation to the axis of the spider, gears carrying shafts, gears carried by the spider and meshing with the stationary gear and the gears on the shafts, the said gears being so arranged as to keep the plates in a predisposed plane and means for rotating the spider and a stationary plate located in front of the center of said spider.

In witness whereof I have hereunto set my hand in the presence of two witnesses.

HARRY M. SCHUTZ.

Witnesses:
MICHELEDE DRAGO,
P. CAZEAU.